United States Patent Office 3,787,366
Patented Jan. 22, 1974

3,787,366
REACTIVE BETA-LACTONE-CONTAINING POLYMERS AND A METHOD FOR THEIR PREPARATION
Walter L. Vaughn, Jackson, Tex., assignor to The Dow Chemical Company, Midland, Mich.
No Drawing. Continuation-in-part of abandoned application Ser. No. 11,362, Feb. 9, 1970. This application Feb. 10, 1972, Ser. No. 225,299
Int. Cl. C08g *15/00*
U.S. Cl. 260—64
10 Claims

ABSTRACT OF THE DISCLOSURE

Polyalkylene copolymers containing pendant beta-lactone groups are prepared by treating a polyalkylene copolymer, containing at least one pendant aldehyde group of the formula

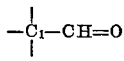

with a ketene of the formula

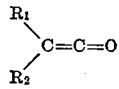

to form one or more pendant beta-lactone groups of the formula

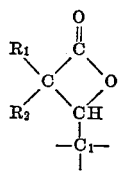

wherein $C_1$ is a carbon atom in the polyalkylene molecule and $R_1$ and $R_2$ are H, alkyl, aryl, aralkyl, alkaryl and the like. The resulting beta-lactone groups are easily cross-linked to form insoluble films and coatings.

CROSS-REFERENCE TO RELATED APPLICATIONS

This application is a continuation-in-part of my copending application Ser. No. 11,362, filed Feb. 9, 1970, now abandoned, being titled as above.

BACKGROUND OF THE INVENTION

The various precursor polyalkylene copolymers utilized to prepare the polymers of this invention are known to the art, generally being olefin copolymers having pendant aldehyde groups.

As used herein, the term "precursor polyalkylene copolymers" refers to copolymers which are prepared from olefinic or vinylic monomers which polymerize through —C=C— unsaturation. Thus, the polymer chain formed is, essentially, a series of alkylene groups which can be illustrated as

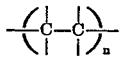

The remainder of the monomer molecule (i.e., that portion which is not in the polyalkylene chain) is pendant from the polyalkylene chain. The polymer is, then, a long-chain hydrocarbon having pendant moieties, some of which contain —CHO groups. Examples of polymerizable compounds which contain such carbon-to-carbon double bonds are olefins, diolefins, vinyls, and vinylidenes.

If the pendant group is an aldehyde, then the polyalkylene copolymer is ready for reaction with a ketene to prepare the beta-lactone containing polymers of the present invention. Where the pendant groups do not include aldehyde groups, but can be converted to same, such conversion is necessary before the polymer can be reacted with a ketene to form the beta-lactone containing polymers of the present invention.

For instance, polyalkylene copolymers containing pendant COOH or COCl groups can be reacted with

groups in order to provide an aldehyde group on the pendant moiety. Such polymers are illustrated in the following U.S. patents: 3,441,545; 3,310,518; and 3,361,842; and 3,413,272.

They are typically prepared by polymerizing an alpha olefin, such as ethylene and/or propylene, with an alpha, beta ethylenically unsaturated carboxylic acid, in the presence of a catalyst and under superatmospheric pressure (generally greater than about 10,000 p.s.i.). These polymers may then be modified to, for instance, aldehydes, acid halides, esters, amides, and like groups. As an example, pendant or terminal —CHO groups may be formed by the inclusion of a monomer into the polymer which contains such a group, by the oxidation of —CHOH groups on such a polymer, by the reduction of an acid halide group and by other methods. The modified (i.e., pendant moieties altered so as to contain —CHO groups) or nonmodified (i.e., already containing —CHO pendant groups) polymers so made may themselves be utilized for coating and film-forming materials. However, the beta-lactone-containing polymers of the instant invention are far more reactive.

Regarding lactone-containing polymers, British Pat. 1,024,388 teaches that vinyl lactones, such as beta-vinyl-beta-propiolactone, are polymerized by the action of free-radical catalysts. It further teaches that ". . . although polymerization probably occurs at the unsaturated linkage, the lactone ring is also concerned in the reaction." Thus, the implication is that polyesters are formed and that the polymer backbone contains ester groups.

SUMMARY OF THE INVENTION

The invention comprises polyalkylene copolymers containing beta-lactone groups, and a method for preparing same.

More particularly, the invention comprises products prepared by treating a polyalkylene copolymer, containing at least one pendant group of the formula

  (I)

with a ketene of the formula

  (II)

to form one or more pendant beta-lactone groups of the formula

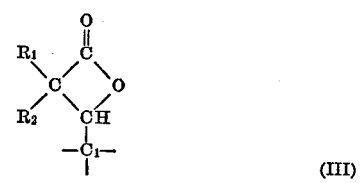  (III)

wherein $C_1$ is a carbon atom in the polyalkylene molecule and $R_1$ and $R_2$ are, independently, H, alkyl, aryl, alkaryl, aralkyl and like groups of up to about 20 carbon atoms.

The resulting beta-lactone-containing copolymers may then be cross-linked to form generally insoluble and tenacious films and coatings.

The copolymers of this invention suitably have a molecular weight of from about 800 to those of high polymers, i.e., in the millions, and preferably a molecular weight of from about 800 to about 10,000.

DETAILED DESCRIPTION OF THE INVENTION

The polyalkylene precursor polymers utilized in this invention may suitably be derived from monomers, or mixtures thereof, which are ethylenically unsaturated and polymerizable. These monomers are well known in the art and include such compounds as alkenes and alkadienes, such as ethylene, propylene, butene, isobutene, pentene, hexene, octene, butadiene, isoprene, etc. (the term alkenes is intended to also include cycloalkenes, such as cyclohexene); unsaturated esters, such as acrylate- and methacrylate-containing monomers, such as alkyl and cycloalkyl (1 to 20 carbon atoms) acrylates and methacrylates, such as methyl methacrylate, ethyl acrylate, i-butyl acrylate, 2-ethylhexyl methacrylate, cyclohexyl acrylate, and the like; vinyl acetate, vinyl propionate, vinyl butyrate, dimethyl maleate, diethyl maleate, ethyl hydrogen maleate, monoethyl fumarate and diethyl fumarate; nitriles and amides containing unsaturated groups, such as acrylo nitrile, methacrylonitrile, acrylamide and methacrylamide; olefinically unsaturated carboxylic acids, such as acrylic acid, methacrylic acid, maleic acid, fumaric acid, itaconic acid and cinnamic acid; and chlorinated and brominated derivatives of the above.

There is the requirement, however, that the precursor polymers of this invention contain at least one monomer which will result in a pendant aldehyde-containing group of Formula I above, or a pendant group which may be converted into such an aldehyde group. Examples of monomers which provide suitable aldehyde groups include acrolein, methacrolein, crotonaldehyde, cinnamaldehyde, tigaldehyde, alpha-methylisocrotonaldehyde, 3-butenal, 7-octenal, 3-methyl-2-butenal, beta-methylcrotonaldehyde and the like.

The beta-lactone-containing polymers of this invention, then, may suitably be prepared by reacting, at no more than about 60° C. (preferably about 20 to 30° C.), 0.005 to 20 weight percent (preferably 1 to 2 weight percent), of the —CHO group-containing polymer in a suitable solvent with a ketene of the formula

(II)

wherein $R_1$ and $R_2$ are as defined above. The beta-lactone-containing polymer results.

One may optionally employ a catalytic amount of a transition metal halide catalyst in the above process to improve reaction kinetics. Suitable catalysts include $AlCl_3$, $AlBr_3$, $ZnCl_2$, $BF_3$ complexes (such as the etherate) and the like.

Preferred polyalkylene precursor polymers are preparing those polymers of Formula III are of the formula (designating copolymerized monomers)

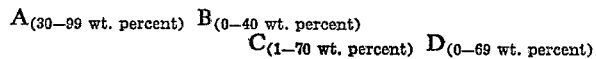

A, B, C and D suitably being in any order, wherein A is ethylene, B is propylene, C is a monomer which will provide a pendant aldehyde group of Formula I, and D is one or more unsaturated ester, amide and/or nitrile as enumerated above.

The more preferred copolymers of this invention include those which are prepared from the preferred ketenes specified herein, and the precursor polymers illustrated below. All percents are weight percent of total, and the legend for the symbols used follows the list:

(1) E(45–99%)-P(0–40%)-A(1–15%)
(2) E(25–98%)-P(0–40%)-A(1–15%)-VA(1–20%)
(3) E(25–98%)-P(0–40%)-A(1–15%)-EA(1–20%)
(4) E(25–98%)-P(0–40%)-A(1–15%)-MA(1–20%)
(5) E(25–98%)-P(0–40%)-A(1–15%)-IBA(1–20%)
(6) E(25–98%)-P(0–40%)-A(1–15%)
   –MMA(1–20%)
(7) E(45–99%)-P(0–40%)-M(1–15%)
(8) E(25–98%)-P(0–40%)-M(1–15%)-VA(1–20%)
(9) E(25–98%)-P(0–40%)-M(1–15%)-EA(1–20%)
(10) E(25–98%)-P(0–40%)-M(1–15%)
   –MA(1–20%)
(11) E(25–98%)-P(0–40%)-M(1–15%)
   –IBA(1–20%)
(12) E(25–98%)-P(0–40%)-M(1–15%)
   –MMA(1–20%)
(13) E(30–99%)-P(0–40%)-C(1–30%)
(14) E(30–99%)-P(0–40%)-CM(1–30%)
(15) E(30–99%)-P(0–40%)-T(1–30%)

E=Ethylene
P=Propylene
A=Acrolein
M=Methacrolein
VA=Vinyl acetate
EA=Ethyl acrylate
MA=Methyl acrylate
IBA=Isobutyl acrylate
MMA=Methyl methacrylate
C=Crotonaldehyde
CM=Cinnamaldehyde
T=Tigaldehyde Anhydrous inert solvents which are suitable for preparing the polymers of this invention include chlorinated hydrocarbon solvents, such as 1,1,1-trichloroethane, perchloroethylene, ethylene dichloride, methylene chloride, o-dichlorobenzene and the like; other organic solvents, such as benzene, toluene, dioxane, xylenes, heptanes and higher aliphatics; alkyl acetates, tetrahydrofuran; fluorohalocarbons, such as trichlorofluoromethane, trifluorotrichloroethane, dibromotetrafluoromethane, tetrachlorodifluoroethane and those fluorocarbons which are suitable for use herein for aerosol application; and mixtures of the above.

Ketenes which are employed in accordance with the present invention are those having the formula

(II)

whereas $R_1$ and $R_2$ may suitably be, independently, hydrogen, alkyl, aryl, alkaryl or aralkyl groups of up to about 20 carbon atoms and the like. Suitable alkyl and cycloalkyl groups include methyl, ethyl, isopropyl, butyl, pentyl, heptyl, 2-methyl-3,4-diethylhexyl, pentadecyl, cyclohexyl and 1-methyl-6-isobutyl-10-ethyldodecyl. Suitable aryl groups include phenyl, naphthyl and the like. Suitable alkaryl or aralkyl groups include phenethyl, diisopropylphenyl, heptylphenylpropyl and hexyloctylphenyl.

Thus one can employ, for example, ketene, diphenyl ketene, dimethyl ketene, ethylbutyl ketene, diethyl ketene, phenylpropyl ketene, hexylphenyl ketene, isopropyl ketene, dibenzyl ketene, phenylethyl ketene, ethylmethyl ketene, methyl ketene, methylphenyl ketene and the like. Preferred ketenes include ketene, dimethyl-, diethyl- and diphenyl-ketenes.

It is to be noted that the amount of residual aldehyde groups desired on the beta-lactone-containing polymer, if any, will dictate the amount of ketene to be utilized. If it is desired to lactonize all, or substantially all, the above groups desired on the beta-lactone-containing polymer, if utilized. Generally from about 0.5 to about 5 ketene equivalents per aldehyde equivalent is suitable, while 1 to 3 is preferred.

Pressure is not a critical variable in the method of this invention, and may suitably be sub-, super- or atmospheric.

It is to be noted that the beta-lactone-containing polymers prepared in accordance with this invention will readily cross-link when the concentration of said polymer in solvent exceeds about 4–6 weight percent. However, the polymers may be made in concentrations of up to 20 weight percent and then diluted. Even if partial cross-linking occurs, the remaining reactive groups may be utilized as taught herein. Also, heating the solution above about 60° C. for a period of time in excess of about one hour will result in cross-linking. Further, addition to the polymer solution of a non-solvent (such as acetone, pentane and the like) may cause a concentration of polymer in excess of the above tolerable limits.

The cross-linked polymer is extremely solvent resistant, no apparent solubilizing effects having been observed after several hours of refluxing one such polymer with toluene.

Under anhydrous conditions in a solvent, a 1–2% polymer solution may be stored for one or more months.

A continuous or non-continuous film may be formed from the polymers taught herein by treating a non-reactive substrate in well-known ways. For instance, a substrate, such as glass, metals and the like, may be dipped into, or sprayed with, a solution of the polymer, the excess solvent removed and the polymer cross-linked by a brief thermal cure (150° C. for 3 minutes, for instance).

SPECIFIC EMBODIMENTS

A 1 g. sample of an ethylene/methacrolein polymer (85.8 weight percent ethylene; 14.2 weight percent methacrolein; M.W.=2500) was dissolved in 20 ml. of dry toluene, then combined with diphenylketene in benzene (2.3 ketene equivalents/polymeric aldehyde equivalents), along with milligram quantities of anhydrous AlCl₃ catalyst.

The mixture was allowed to react for one week, under an inert nitrogen atmosphere, at ambient temperature (26° C.). Upon analysis it was found that the polymer products contained essentially no aldehyde groups and was rich in functional beta-lactone groups, indicating that a conversion approaching theoretical was achieved.

A number of beta-lactone-containing polymers are obtained by the general procedure:

(a) A polymer containing pendant aldehyde groups is dissolved in an inert anhydrous solvent;

(b) The mixture is contacted with the desired ketene (preferably one which dimerizes slowly and/or reacts with aldehyde groups rapidly), optionally with a catalyst, such as those which are detailed above;

(c) This mixture is then allowed to react at a temperature of no more than about 60° C. for a period of time sufficient for the reaction to go to completion, such as, for instance, 24 hours or more.

After the reaction is complete, the product mixture may be purified, diluted, stored, etc., as desired.

To further exemplify the reactive copolymers of this invention which may be prepared, the following aldehyde-group-containing copolymers may be reacted with, for example, any of these ketenes—ketene, dimethyl ketene, diethyl ketene, diisopentyl ketene, diisopropyl ketene, ethylphenyl ketene, diphenyl ketene, and the like:

Ethylene (86 wt. percent/methacrolein (16 wt. percent)
Ethylene (97 wt. percent/methacrolein (3 wt. percent)
Ethylene (70 wt. percent)/i-butylacrylate (20 wt. percent)/acrolein (10 wt. percent)
Ethylene (70 wt. percent)/i-butylacrylate (27 wt. percent)/acrolein (3 wt. percent)
Ethylene (70 wt. percent)/i-butylacrylate (20 wt. percent)/methacrolein (10 wt. percent)
Ethylene (90 wt. percent)/propylene (5 wt. percent)/methacrolein (5 wt. percent)
Ethylene (85 wt. percent)/methacrolein (15 wt. percent)
Ethylene (80 wt. percent)/acrolein (20 wt. percent)
Ethylene (90 wt. percent)/3-butenal (10 wt. percent)
Ethylene (80 wt. percent)/acrylic acid (10 wt. percent)/acrolein (10 wt. percent)
Ethylene (35 wt. percent)/i-butylacrylate (50 wt. percent)/acrolein (15 wt. percent)
Ethylene (40 wt. percent)/propylene (35 wt. percent)/acrylonitrile (5 wt. percent)/methacrolein (20 wt. percent)
Ethylene (30 wt. percent)/ethylacrylate (20 wt. percent)/methacrolein (50 wt. percent).

I claim:

1. A polyalkylene copolymer containing at least one pendant beta-lactone group of the formula

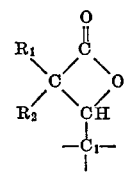
(III)

wherein $C_1$ is a carbon atom in the polyalkylene molecule, said polyalkylene molecule having a polymer chain which is a series of alkylene groups of the formula $(CH_2—CH_2)_n$; $n$ being an integer large enough to provide for a molecular weight of at least about 800, and $R_1$ and $R_2$ are, independently, hydrogen, alkyl, aryl, aralkyl or alkaryl groups of up to about 20 carbon atoms.

2. The copolymer of claim 1 wherein the molecular weight is from about 800 to about 10,000.

3. The composition of claim 1 wherein $C_1$ is a carbon atom in a copolymer molecule selected from the group consisting of copolymerized moieties designated by the formula

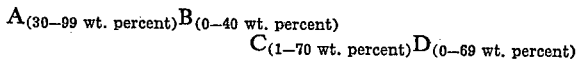

A, B, C and D suitably being in any order, wherein A is ethylene, B is propylene, C is acrolein, methacrolein, crotonaldehyde, cinnamaldehyde, tigaldehyde, Alpha-methylisocrotonaldehyde, 3-butenal, 7-octenal, 3-methyl-2-butenal, or Beta-methylcrotonaldehyde; and D is alkyl acrylate or methacrylate, a cycloalkyl acrylate or methacrylate, wherein said alkyl and cycloalkyl groups contain from 1 to 20 carbon atoms, vinyl acetate, vinyl propionate, vinyl butyrate, dimethyl maleate, diethyl maleate, ethyl hydrogen maleate, monoethyl fumarate, diethyl fumarate, acrylonitrile, methacrylonitrile, acrylamide, methacrylamide, acrylic acid, methacrylic acid, maleic acid, fumaric acid, itaconic acid, or cinnamic acid.

4. A process for preparing the composition of claim 1 which comprises contacting, at no more than about 60° C., a 0.005 to 20.0 weight percent solution of a polyalkylene copolymer which contains at least one pendant group of the formula

(I)

with an amount of a ketene sufficient to convert at least one of the aldehyde groups of the formula

(I)

to the beta-lactone groups of Formula III in claim 1, the above ketene being of the formula

  (II)

wherein $C_1$, $R_1$ and $R_2$ are as defined in claim 1.

5. The process of claim 4 wherein the polymer has a concentration in the solution of from 1 to 2 weight percent.

6. The process of claim 4 wherein the reaction temperature is from 20° to 30° C.

7. The process of claim 4 wherein from about 0.5 to 5.0 ketene equivalents are utilized per aldehyde equivalent.

8. The process of claim 4 wherein 1 to 3 equivalents are utilized.

9. The process of claim 4 wherein $R_1$ and $R_2$ are H, methyl, ethyl or phenyl.

10. An inert anhydrous solvent containing up to about 20% by weight of the composition of claim 1.

References Cited
UNITED STATES PATENTS

| | | | |
|---|---|---|---|
| 3,351,613 | 11/1967 | Natta et al. | 260—64 |
| 3,377,318 | 4/1968 | Kiss | 260—73 |
| 3,422,069 | 1/1969 | Natta et al. | 260—64 |

FOREIGN PATENTS

| | | | |
|---|---|---|---|
| 1,024,388 | 3/1966 | Great Britain | 260—64 |

LESTER L. LEE, Primary Examiner

U.S. Cl. X.R.

117—124 E, 132 B; 260—30.4 R, 30.4 N, 31.4 R, 33.6 UA, 33.8 UA, 67 FD

PO-1050
(5/69)

UNITED STATES PATENT OFFICE
CERTIFICATE OF CORRECTION

Patent No. 3,787,366          Dated January 22, 1974

Inventor(s) Walter L. Vaughn

It is certified that error appears in the above-identified patent and that said Letters Patent are hereby corrected as shown below:

Column 4, lines 72 and 73 should be:

-- groups, generally a slight excess over equivalency is to be utilized. Generally from about 0.5 to about 5 ketene equiv- --

Signed and sealed this 19th day of November 1974.

(SEAL)
Attest:

McCOY M. GIBSON JR.          C. MARSHALL DANN
Attesting Officer          Commissioner of Patents